United States Patent
Wee et al.

(10) Patent No.: US 7,486,973 B2
(45) Date of Patent: Feb. 3, 2009

(54) POP-UP TYPE PORTABLE TERMINAL

(75) Inventors: Jong-Cheon Wee, Yongin-si (KR);
Hyon-Myong Song, Suwon-si (KR);
Hong-Bae Kim, Yongin-si (KR);
Jae-Shik Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 77 days.

(21) Appl. No.: 10/964,881

(22) Filed: Oct. 14, 2004

(65) Prior Publication Data
US 2005/0197173 A1    Sep. 8, 2005

(30) Foreign Application Priority Data
Mar. 4, 2004    (KR) ..................... 10-2004-0014582

(51) Int. Cl.
*H04M 1/00* (2006.01)
(52) U.S. Cl. .............. 455/575.1; 455/550.1; 455/575.4; 455/575.8
(58) Field of Classification Search .............. 455/575.1, 455/550.1, 575.4, 575.8
See application file for complete search history.

(56) References Cited

U.S. PATENT DOCUMENTS

| | | | |
|---|---|---|---|
| 6,950,316 B2* | 9/2005 | Pan et al. .................... | 361/814 |
| 6,950,516 B2* | 9/2005 | Pirila et al. ............ | 379/433.12 |
| 6,973,186 B2* | 12/2005 | Shin ....................... | 379/433.12 |
| 6,980,840 B2* | 12/2005 | Kim et al. ................ | 455/575.4 |
| 7,117,011 B2* | 10/2006 | Makino .................... | 455/556.1 |
| 2004/0198477 A1* | 10/2004 | Jung et al. ............... | 455/575.4 |
| 2005/0018394 A1* | 1/2005 | Park et al. .................. | 361/683 |
| 2005/0278896 A1* | 12/2005 | Nishihara .................... | 16/341 |

FOREIGN PATENT DOCUMENTS

| JP | 02002152347 A | * | 5/2002 |
|---|---|---|---|
| JP | 2003-309631 | | 10/2003 |
| KR | 10-2001-0077284 | | 8/2001 |

* cited by examiner

*Primary Examiner*—Nghi H Ly
(74) *Attorney, Agent, or Firm*—The Farrell Law Firm, PC

(57) ABSTRACT

Disclosed is a pop-up type portable terminal. The pop-up type portable terminal includes a main housing, a sub-housing slidably coupled to the main housing such that the sub-housing is slidably accommodated in or withdrawn from the main housing, a main board installed in the main housing, a guide beam fixed to one side of the main board and extending lengthwise along the main board, a guide rail installed at a rear surface of the sub-housing and extending lengthwise along the sub-housing so as to engage with the guide beam for guiding a sliding movement of the sub-housing, and a torsion coil spring installed in the main housing and having a first end portion fixedly coupled to the main housing and a second end portion fixedly coupled to the sub-housing in order to provide bias force in a direction urging the sub-housing to be withdrawn from the main housing. Noise caused by friction between the guide beam and the guide rail is thereby significantly reduced.

7 Claims, 6 Drawing Sheets

POP-UP TYPE PORTABLE TERMINAL

PRIORITY

This application claims priority to an application entitled "Pop-Up Type Portable Terminal" filed in the Korean Intellectual Property Office on Mar. 4, 2004 and assigned Ser. No. 2004-14582, the contents of which are hereby incorporated by reference.

BACKGROUND OF THE INVENTION

1. Field of the Invention

The present invention relates to a portable terminal, and more particularly to a pop-up type portable terminal including a pair of housings, which are slidably coupled with each other in such a manner that one housing can be slidably accommodated in or withdrawn from the other housing.

2. Description of the Related Art

Generally, portable terminals are electronic appliances for providing wireless communication between users and service providers or allowing users to perform wireless communication with other users. Such portable terminals are classified into bar-type portable terminals, flip-type portable terminals, and folder-type portable terminals according to their construction.

The bar-type portable terminal has a single housing equipped with data input/output units and signal receiving/transmitting units. In the bar-type portable terminal, the data input unit, such as a keypad, is always exposed, so the bar-type portable terminal may be inadvertently operated. In addition, since a predetermined distance must be ensured between the signal receiving unit and the signal transmitting unit, it is difficult to make the bar-type portable terminal in a compact size.

The flip-type portable terminal includes a body, a flip and a hinge module connecting the flip to the body. The body is equipped with data input/output units and signal receiving/transmitting units. The data input unit, such as a keypad, is positioned on the body and is covered with the flip, so the flip-type portable terminal can be prevented from being inadvertently operated. However, the flip-type portable terminal also requires a predetermined distance between the signal receiving unit and the signal transmitting unit, so it is difficult to make the flip-type portable terminal in a compact size.

The folder-type portable terminal includes a body, a folder and a hinge module rotatably connecting the body to the folder in such a manner that the folder is moved between an opened position and a closed position with respect to the body. Such a folder-type portable terminal may be maintained in a call-wait mode when the folder is in the closed position with respect to the body, thereby preventing the keypad from being inadvertently operated. In a communication mode, the folder is positioned in the opened position with respect to the body so that a sufficient distance may be ensured between the signal receiving unit and the signal transmitting unit. Thus, the folder-type portable terminal can be fabricated in a compact size. For this reason; folder-type portable terminals have been widely used.

In the flip-type portable terminal or the folder-type portable terminal, a flip or a folder is rotatably coupled to a body by means of a hinge module. When the flip or the folder has been rotated with respect to the body by a predetermined angle, the typical hinge module applies a bias force to the flip or the folder in such a manner that the flip or the folder is shifted into a completely opened position with respect to the body, even if external force is not additionally applied to the flip or the folder. In addition, during opening the flip or the folder will return to the closed position with respect to the body by means of the hinge device if the flip or the folder is rotatably moved away from the body by less than the predetermined angle. During closing, once the flip or folder moves past the predetermined angle, the flip or folder will move to the closed position without additional force.

Although various designs have been proposed for the conventional portable terminals, they do not completely satisfy various tastes of consumers. For instance, various kinds of pop-up type portable terminals including a pair of housings, which are slidably coupled with each other, have been proposed. However, such pop-up type portable terminals may generate a metallic noise when one housing is slidably moved with respect to the other housing, thereby annoying the user.

SUMMARY OF THE INVENTION

Accordingly, the present invention has been made to solve the above-mentioned problems occurring in the prior art, and an object of the present invention is to provide a portable terminal having a structure capable of satisfying various tastes of consumers.

Another object of the present invention is to provide a portable terminal capable of effectively eliminating noise when one housing is slidably moved with respect to another housing, thereby improving convenience of use.

To accomplish the above object, there is provided a pop-up type portable terminal comprising: a main housing; a sub-housing slidably coupled to the main housing such that the sub-housing is slidably accommodated in or withdrawn from the main housing; a main board installed in the main housing; a guide beam fixed to one side of the main board and extending lengthwise along the main board; a guide rail installed at a rear surface of the sub-housing and extending lengthwise along the sub-housing so as to engage with the guide beam for guiding a sliding movement of the sub-housing; and a torsion coil spring installed in the main housing and having a first end portion fixedly coupled to the main housing and a second end portion fixedly coupled to the sub-housing in order to provide a bias force in a direction urging the sub-housing to be withdrawn from the main housing.

BRIEF DESCRIPTION OF THE DRAWINGS

The above objects and other features and advantages of the present invention will be more apparent from the following detailed description taken in conjunction with the accompanying drawings, in which.

DETAILED DESCRIPTION OF THE PREFERRED EMBODIMENT

Figure 1:
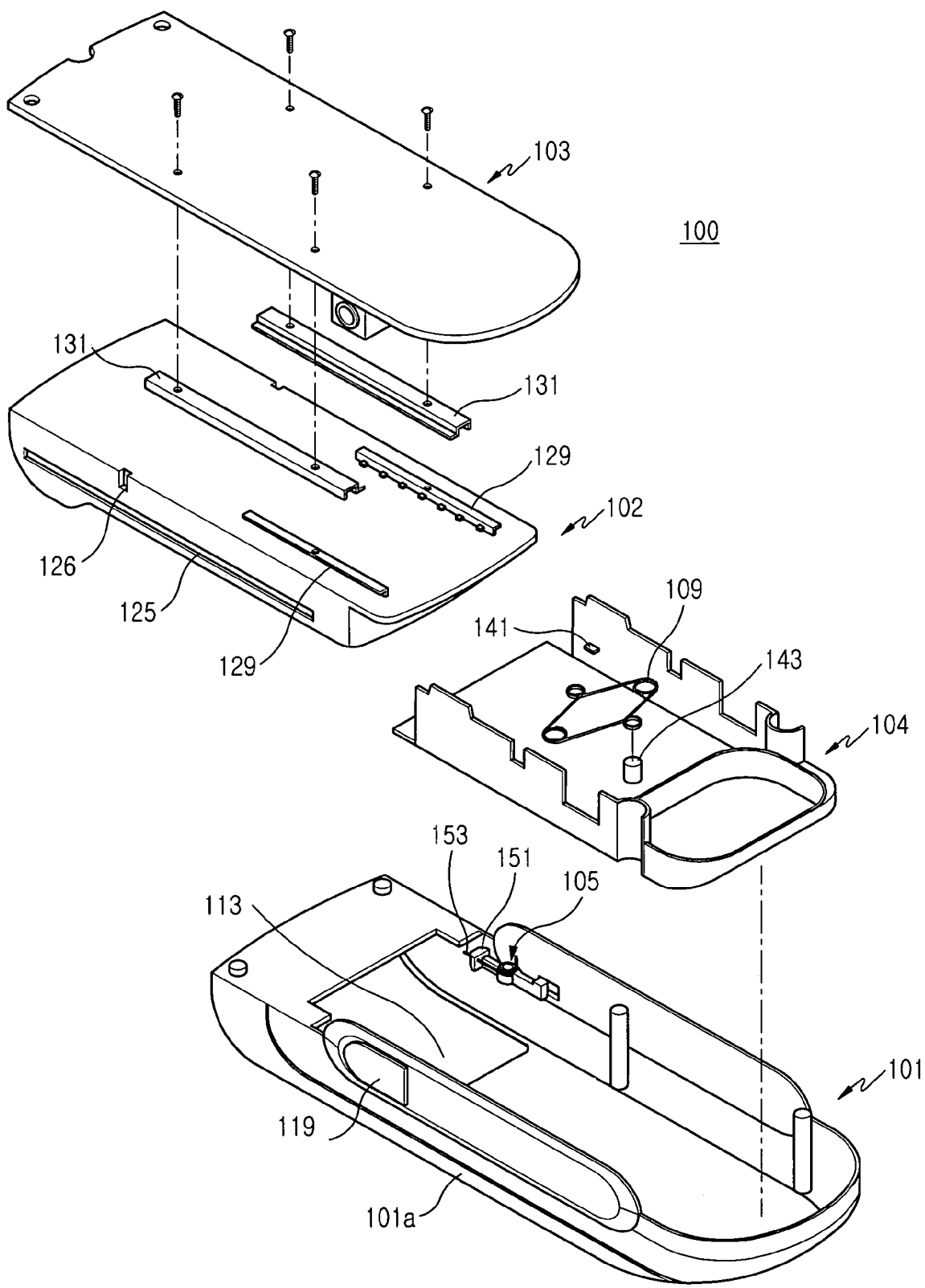
FIG. 1 is an exploded perspective view showing a pop-up type portable terminal according to an exemplary embodiment of the present invention.

Hereinafter, a preferred embodiment of the present invention will be described with reference to the accompanying drawings. In the following description of the present invention, the same reference numerals are used to designate the same or similar components and a detailed description of known functions and configurations incorporated herein will be omitted when it may make the subject matter of the present invention unclear.

Figure 2:
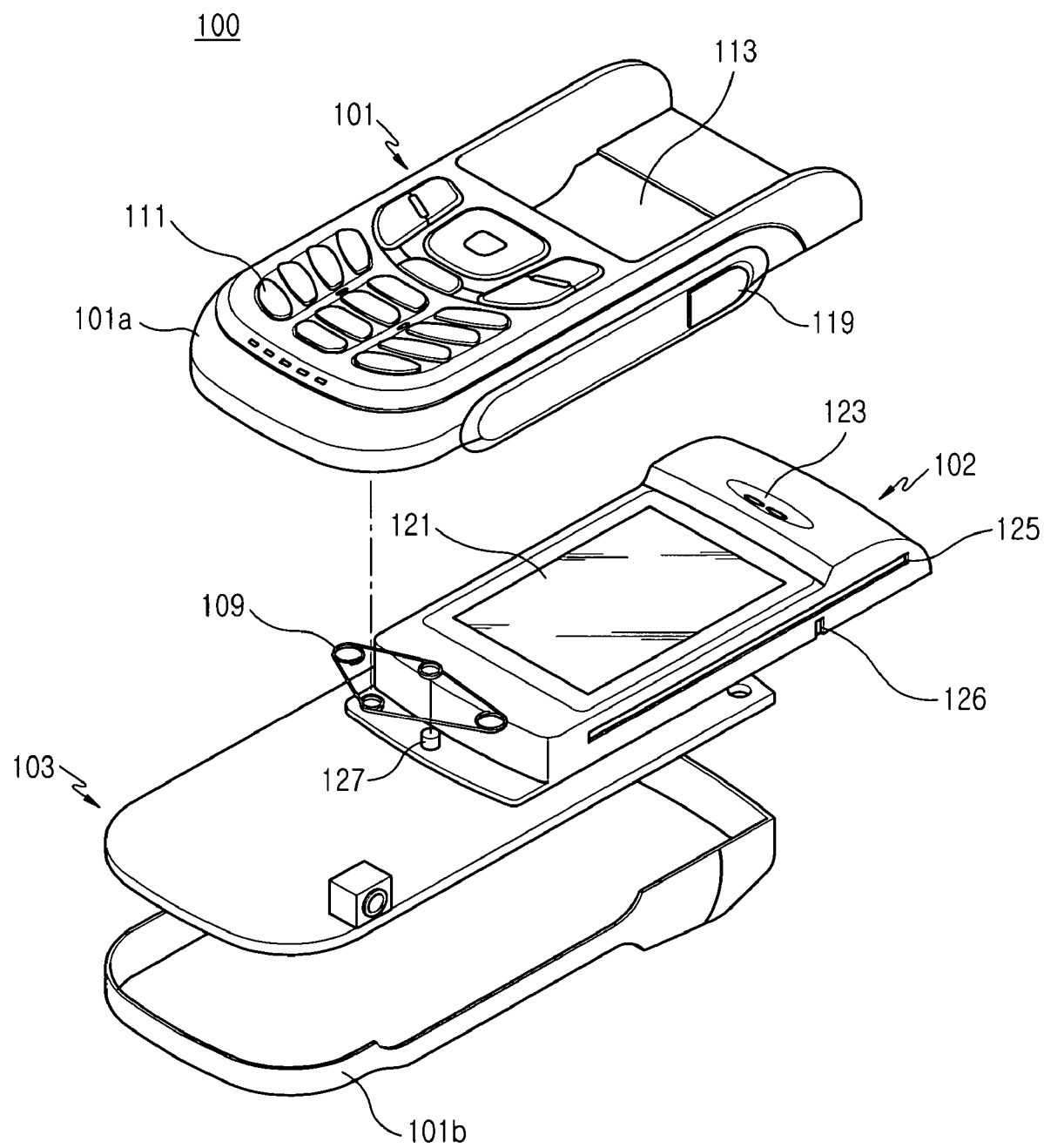
FIG. 2 is an exploded perspective view of a pop-up type portable terminal shown in FIG. 1 representing front appearances of components of the pop-up type portable terminal.
Figure 5:
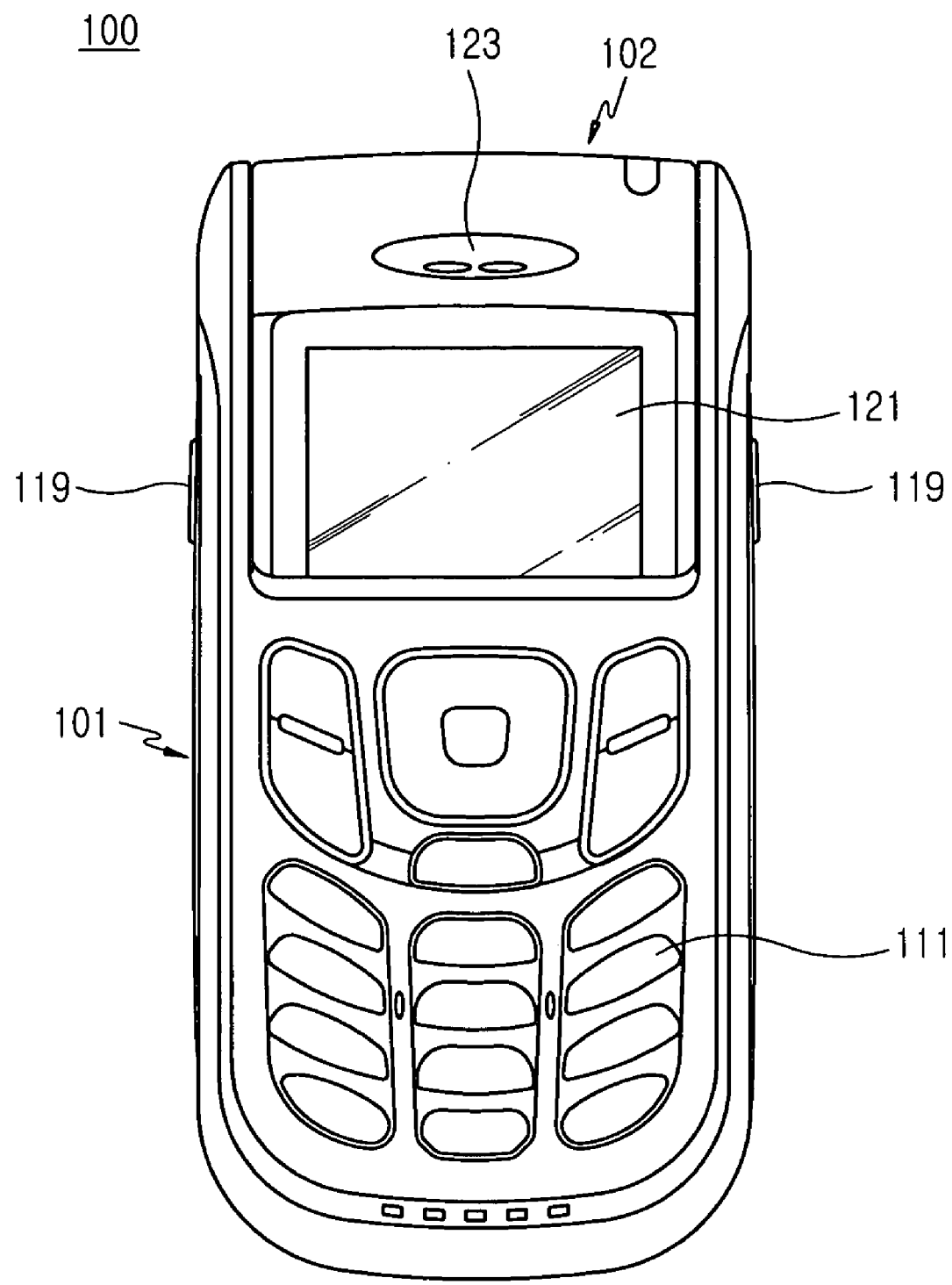
FIG. 5 is a front view of a pop-up type portable terminal shown in FIG. 1 showing a sub-housing accommodated in a main housing.
Figure 6:
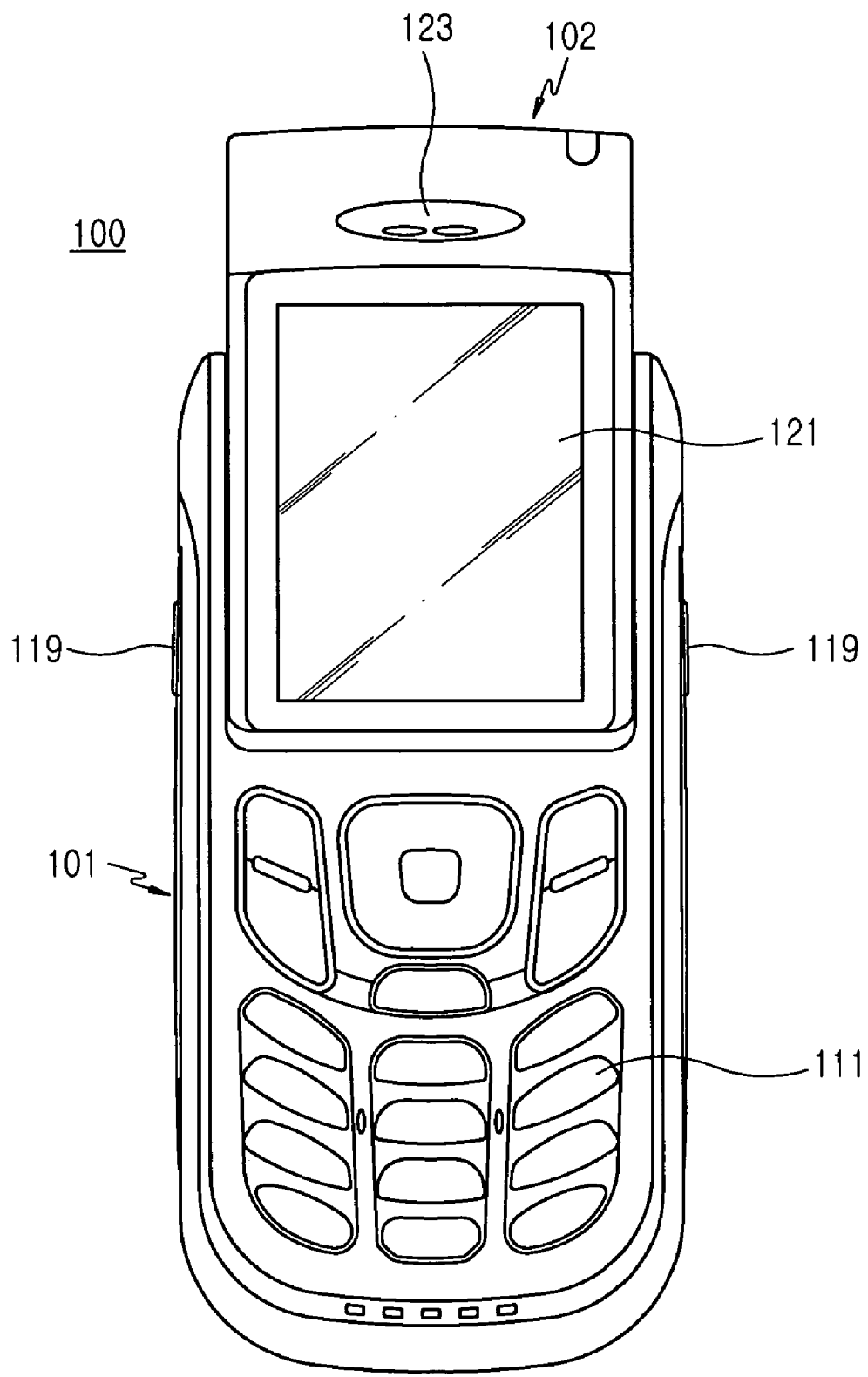
FIG. 6 is a front view of a pop-up type portable terminal shown in FIG. 1 showing a sub-housing withdrawn from a main housing.

As shown in FIGS. 1 and 2, the pop-up type portable terminal 100 according to the exemplary embodiment of the present invention includes a main housing 101 and a sub-housing 102. Guide beams 131 are fixed to a main board 103 of the main housing 101 and guide rails 129 are installed at a rear surface of the sub-housing 102. The sub-housing 102 is slidably moved along the guide beams 131 and the guide rails 129 such that the sub-housing 102 is accommodated in or withdrawn from the main housing 101, as shown in FIGS. 5 and 6.

The main housing 101 has a front cover 101a and a rear cover 101b, as seen in FIG. 2. An opening 113 is formed at a predetermined portion of the front cover 101a and extends to one end of the front cover 101a. A keypad 111 is provided at a front surface of the front cover 101a. The main board 103 is installed in the main housing 101 on the rear side of front cover 101a and the guide beams 131 are installed on the main board 103. The guide beams 131 extend lengthwise along the main board 103 and are fixed to the main board 103 by coupling means, such as screws. Preferably, the guide beams 131 are made from high-strength metallic material, such as stainless steel. Preferably, a pair of guide beams 131 are installed on the main board 103 in parallel to each other in order to stably guide a sliding movement of the sub-housing 102. Although the present embodiment illustrates that the guide beams 131 are fixed to the main board 103 by means of the screws, the guide beams 131 can be integrally formed with the main board 103 without using the screws.

Figure 3:
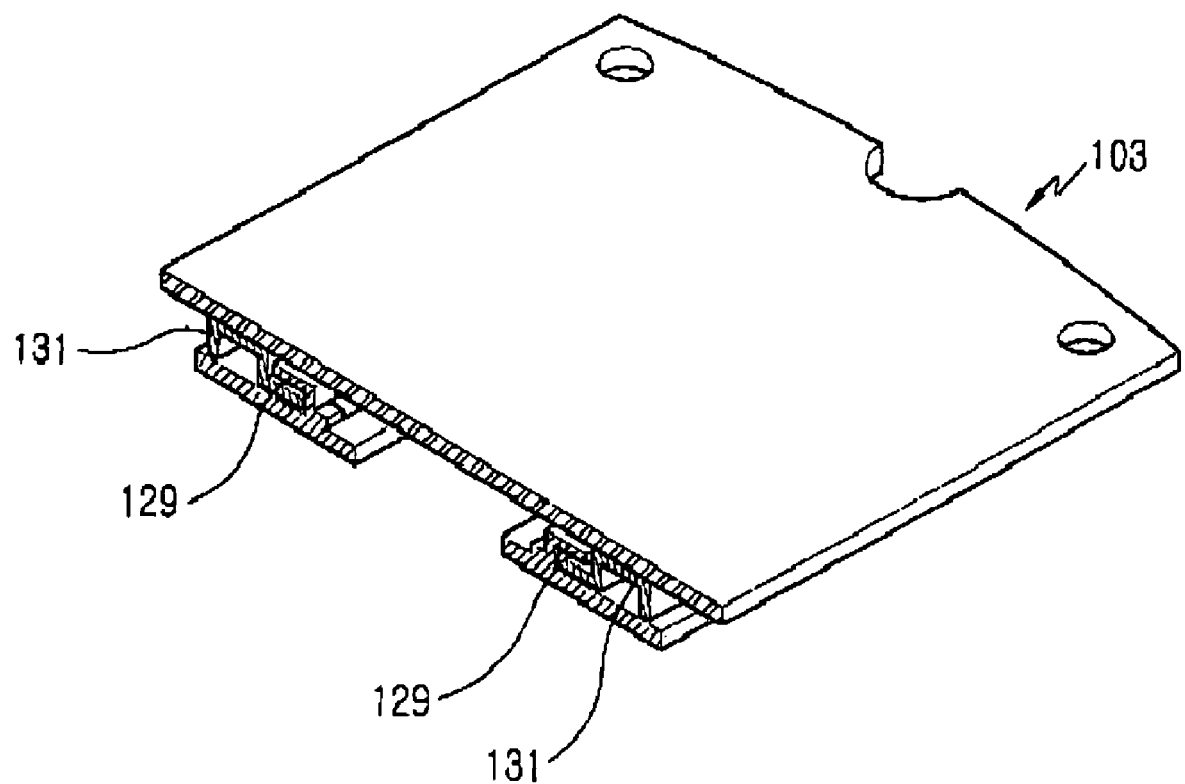
FIG. 3 is a perspective view showing a guide beam coupled with a guide rail of a pop-up type portable terminal shown in FIG. 1.

The sub-housing 102 is provided on its front surface thereof with a display unit 121 and a signal receiving unit 123. The guide rails 129 are installed at the rear surface of the sub-housing 102. The guide rails 129 extend lengthwise along the sub-housing 102 in such a manner that the guide rails 129 are slidably coupled with the guide beams 131. Referring to FIG. 3, the lower ends of the guide beams 131 are spaced from the main board 103 by a predetermined distance and extend in opposition to each other, and the guide rails 129 are positioned between the lower ends of the guide beams 131. That is, the lower ends of the guide beams 131 are coupled with the guide rails 129. The guide rails 129 are slidably moved while being engaged with the guide beams 131 so that the sub-housing 102 can be slidably moved. Preferably, the guide rails 129 are made from synthetic resin material having lubricant property, such as POM (Poly-OxyMethylene), in order to reduce noise when the guide rails 129 slidably move along the guide beams 131.

Meanwhile, a keypad bracket 104 is installed at a front inner portion of the main housing 101. The keypad bracket 104 surrounds both sides of the sub-housing 102. Although it is not illustrated, a flexible printed circuit board provided with dome switches is positioned between an inner portion of the main housing 101 and the keypad bracket 104. The dome switches are aligned corresponding to key buttons of the keypad 111.

A guide protrusion 141 is formed at both inner peripheral surfaces of the keypad bracket 104 and a guide slot 125 is formed lengthwise along both sides of the sub-housing 102 corresponding to the guide protrusion 141. The guide protrusion 141 is slidably inserted into the guide slot 125 so as to guide the sliding movement of the sub-housing 102.

That is, the guide slot 125 and the guide protrusion 141 may guide the sliding movement of the sub-housing 102 while supporting the sub-housing 102. In addition, the guide beams 131 and the guide rails 129 also guide the sliding movement of the sub-housing 102. If the guide protrusion 141 slidably moves along the guide slot 125 while being closely positioned with regard to the guide slot 125, a predetermined space may be formed between the guide beams 131 and the guide rails 129.

The guide protrusion 141 is inserted into the guide slot 125 to maintain substantially point-contact with an inner wall of the guide slot 125, and the guide beams 131 are coupled to the guide rails 129 to maintain substantially surface-contact with the guide rails 129. By closely positioning the guide protrusion 141 with regard to the guide slot 125 and ensuring the predetermined space between the guide beams 131 and the guide rails 129, noise caused by the sliding movement of the sub-housing 102 can be significantly reduced. However, if the guide protrusion 141 is excessively adhered to the guide slot 125, the sliding movement of the sub-housing 102 may be interrupted. In addition, if the space between the guide beams 131 and the guide rails 129 is too large, the sliding movement of the sub-housing 102 may not be carried out smoothly.

The portable terminal 100 includes an elastic member, such as a torsion coil spring 109, for providing a bias force so as to withdraw the sub-housing 102 from the main housing 102, and a locking unit 105 for allowing the sub-housing 102 to be fixedly accommodated in the main housing 101.

The torsion coil spring 109 includes upper and lower ring parts and left and right side ring parts. The upper ring part of the torsion coil spring 109 is fixed in the main housing 101. In detail, the upper ring part of the torsion coil spring 109 is fixedly coupled to a support protrusion 143 (FIG. 1) formed on the keypad bracket 104 and the lower ring part of the torsion coil spring 109 is fixedly coupled to a support protrusion 127 (FIG. 2) formed on the sub housing 102. When the sub-housing 102 is accommodated in the main housing 101, the torsion coil spring 109 is compressed. That is, the upper and lower ring parts of the torsion coil spring 109 are closely adjacent to each other while compressing the torsion coil spring 109. Such compressed spring force of the torsion coil spring 109 is applied to the sub-housing 102 when the sub-housing 102 is withdrawn from the main housing 101.

Figure 4:
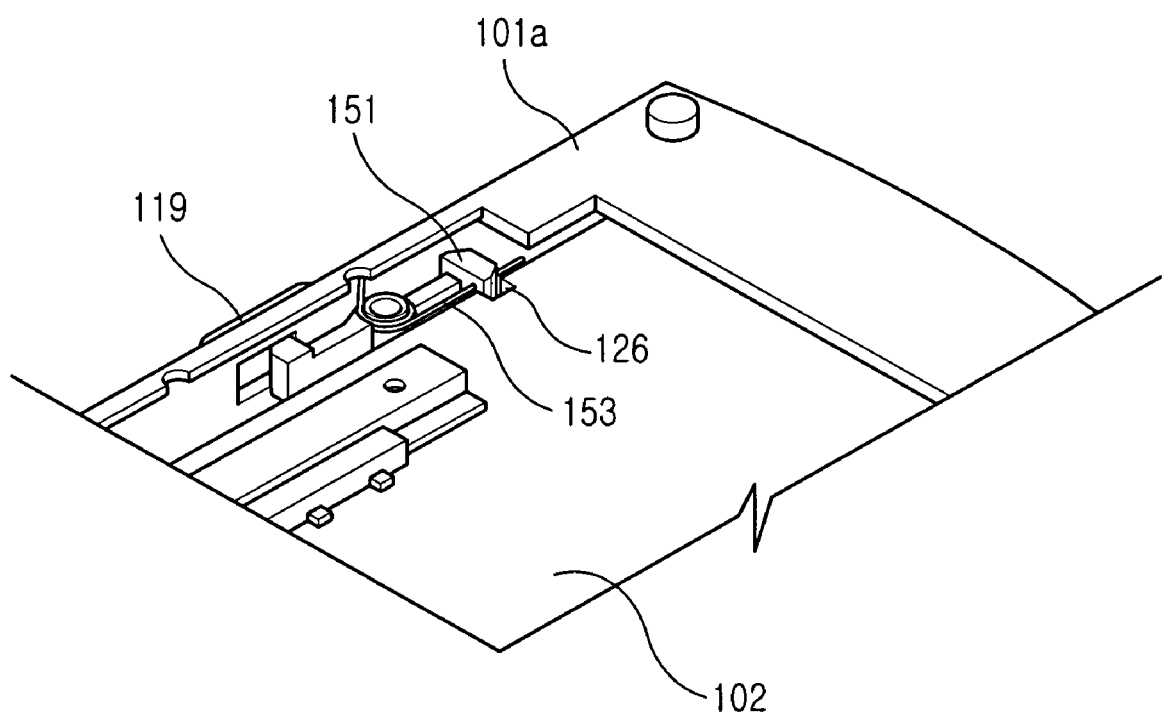
FIG. 4 is a perspective view showing a locking unit of a pop-up type portable terminal shown in FIG. 1.

Referring to FIG. 4, the locking unit 105 includes a locking slot 126 formed on at least one side surface of the sub-housing 102, and a locking protrusion 151 formed at an inner surface of the main housing 101 such that the locking protrusion 151 is selectively engaged with the locking slot 126. The locking protrusion 151 is installed at an end portion of a lever in such a manner that the locking protrusion 151 is engaged with the locking slot 126 by means of a bias force of a spring 153 when the sub-housing 102 is accommodated in the main housing 101. Since the locking protrusion 151 is engaged with the locking slot 126, the sub-housing 102 can be fixedly accommodated in the main housing 101 even if the torsion coil spring 109 applies the bias force to the sub-housing 102. Preferably a pair of locking units 105 are installed at both sides of the sub-housing 102 symmetrically to each other so that the bias force of the torsion coil spring 109 can be uniformly distributed towards both sides of the sub-housing 102.

A release button 119 is provided at a side portion of the main housing 101 so as to release the locking unit 105. If a user pushes the release button 119, the locking protrusion 151 is separated from the locking slot 126 so that the sub-housing 102 is withdrawn from the main housing 101 by means of the bias force of the torsion coil spring 109.

Referring to FIGS. 5 and 6, the display unit 121 may be partially exposed to the exterior even if the sub-housing 102 is accommodated in the main housing 101. The exposed part of the display unit 121 may be used for displaying information including a transmission status of a base station, battery power, and present time.

When the sub-housing 102 has been withdrawn from the main housing 101, the display unit 121 is completely exposed to the exterior so that the display unit 121 displays information transmitted from service providers or other users or displays an image allowing the user to play a game or to utilize the Internet.

As described above, the portable terminal according to the present invention includes a main housing and a sub-housing slidably accommodated in or withdrawn from the main housing, in which noise caused by friction between a guide beam and a guide rail can be reduced. In addition, the sliding movement of the sub-housing is guided along a rear surface and a side surface of the sub-housing so that the sub-housing can stably carry out the sliding movement with respect to the main housing. Furthermore, the sub-housing is withdrawn from the main housing by means of a torsion coil spring so that a user may conveniently use the portable terminal.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A pop-up type portable terminal comprising:
   a main housing having an opening;
   a sub-housing having a display unit, the sub-housing slidably moveable between a first position where the display unit is partially exposed by the opening and a second position where the display unit is completely exposed;
   at least one guide beam installed on a main board disposed in the main housing;
   at least one guide rail disposed in the sub-housing and engaging the at least one guide beam in a surface contact;
   at least one guide protrusion formed in a keypad bracket installed in the main housing; and
   at least one guide slot formed in the sub-housing and engaging the at least one guide protrusion in a point contact;
   wherein a combination including the at least one guide beam, at least one guide rail, at least one guide protrusion and at least one guide slot reduces noise of a sliding movement of the sub-housing and stably guides the sliding movement.

2. The pop-up type portable terminal as claimed in claim 1, further comprising an elasticity unit having one end and an other end, the one end being coupled to the main housing and the other end being coupled to the sub-housing, for providing an elastic force in a direction urging the sub-housing to be withdrawn from the main housing.

3. The pop-up type portable terminal as claimed in claim 2, wherein the elastic unit is a torsion coil spring.

4. The pop-up type portable terminal as claimed in claim 1, further comprising a keypad bracket installed at an inner portion of the main housing such that the keypad bracket surrounds both side portions of the sub-housing.

5. The pop-up type portable terminal as claimed in claim 1, wherein the sub-housing includes a locking slot formed in at least one surface of the sub-housing, and the main housing includes a locking protrusion selectively engaged with the locking slot, the locking protrusion being engaged with the locking slot when the sub-housing is accommodated in the main housing.

6. The pop-up type portable terminal as claimed in claim 1, wherein the at least one guide beam is made from stainless steel (SUS) material, and the at least one guide rail is made from PolyOxyMethylene (POM) material.

7. The pop-up type portable terminal as claimed in claim 1, wherein a pair of torsion coil springs are installed in the main housing symmetrically to each other.

* * * * *